United States Patent [19]
Gutjahr et al.

[11] 3,926,671

[45] Dec. 16, 1975

[54] METHOD OF MANUFACTURING POSITIVE NICKEL HYDROXIDE ELECTRODES

[75] Inventors: Manfred A. Gutjahr, Wendlingen (Neckar), Germany; Rudolf Schmid, Vienna, Austria; Klaus D. Beccu, Geneva, Switzerland

[73] Assignee: Battelle Memorial Institute, Switzerland

[22] Filed: June 5, 1974

[21] Appl. No.: 476,724

[30] Foreign Application Priority Data
June 7, 1973  Switzerland.......................... 8239/73

[52] U.S. Cl. .................................................. 136/29
[51] Int. Cl.² ......................................... H01M 43/04
[58] Field of Search ............. 136/29, 28, 36, 37, 49, 136/120 R, 120 FC; 75/200, 201, 208 R, 222, 224; 264/317; 29/191.2

[56] References Cited
UNITED STATES PATENTS

| | | | |
|---|---|---|---|
| 2,498,873 | 2/1950 | Blue................................... | 29/191.2 |
| 2,860,175 | 11/1958 | Justi.............................. | 136/120 FC |
| 3,186,871 | 6/1965 | Donohue............................. | 136/29 |
| 3,226,263 | 12/1965 | Oswin........................... | 136/86 D X |
| 3,408,180 | 10/1968 | Winkler............................ | 75/222 X |
| 3,542,600 | 11/1970 | Pohlmann....................... | 136/120 R |
| 3,579,385 | 5/1971 | Feduska et al................... | 136/29 X |
| 3,627,859 | 12/1971 | Mesite et al. ....................... | 264/317 |
| 3,799,808 | 3/1974 | Hancock.............................. | 136/29 |

*Primary Examiner*—John H. Mack
*Assistant Examiner*—C. F. LeFevour

[57] ABSTRACT

Method of manufacturing a positive nickel hydroxide electrode. A highly porous core structure of organic material having a fibrous or reticular texture is uniformly coated with nickel powder and then subjected to a thermal treatment which provides sintering of the powder coating and removal of the organic core material. A consolidated, porous nickel support structure is thus produced which has substantially the same texture and porosity as the initial core structure. To provide the positive electrode including the active mass, nickel hydroxide is deposited in the pores of the nickel support structure.

11 Claims, No Drawings

METHOD OF MANUFACTURING POSITIVE NICKEL HYDROXIDE ELECTRODES

Positive electrodes with nickel hydroxide as the active mass are used in various alkaline accumulators, e.g. of the Ni-Cd or Ni-Fe type. Nickel hydroxide provides particular advantages as the active mass due to its high reversibility, low self-discharge and its being substantially insoluble in alkaline electrolytes and hence having a long useful life-time. This active mass moreover provides satisfactory positive discharge potentials and allows high charge and discharge rates due to a rapid redox reaction involving proton diffusion. Nickel hydroxide electrodes further provide high performance at low temperatures, as well as a satisfactory theoretical specific capacity per unit mass at a low cost of the active mass.

In view of these advantages of the active mass, nickel hydroxide electrodes are of particular interest for use in alkaline accumulators which have a high specific capacity and are required to provide high energy and power densities during discharge.

However, nickel hydroxide only has an insignificant electrical conductivity so that high current loads are only possible if the entire active mass is in intimate contact with a large surface of a good electronic conductor. To this end, sintered nickel plates having fine pores are generally provided as an electrode support.

Nickel hydroxide electrodes are generally used with such a porous nickel support, which is manufactured by sintering nickel powder on a perforated, nickel-plated steel band or steel netting, and the active nickel hydroxide mass is then introduced into the pores of the sintered nickel structure by repeatedly applying a chemical precipitation process.

However, the porosity of such electrode support structures made of sintered nickel powder is limited due to the necessity of ensuring satisfactory mechanical stability, and the proportion by weight of the sintered nickel powder structure in the electrode is relatively high. Moreover, even when the manufacturing conditions are carefully controlled, and the various operations of the chemical impregnation process are repeated several times, it is only possible to fill the available pore volume of the sintered support to a limited extent.

The useful specific capacity per unit weight of the whole electrode is thus quite limited and amounts at most to about 40% of the theoretically calculated value based on the active mass.

In addition, the high expense which must be incurred to ensure precisely controlled manufacturing conditions, high investment costs for the sintering and impregnating installations, as well as high material cost of the supporting structure, lead to a high cost of these known nickel hydroxide electrodes with sintered nickel supports.

These known electrodes thus have various drawbacks and limitations which are inherent in their structure and mode of manufacture.

In order to reduce the electrode weight, it has been proposed to manufacture the support structure by sintering nickel fibers together. Although this provides a certain weight reduction, it entails a substantial cost increase as the manufacture of nickel fibers is particularly expensive.

It has further been proposed to manufacture nickel support structures by first chemically or galvanically coating a porous core structure (fabric, fiber felt or foam) of organic material or carbon with nickel, and then subjecting the coated structure to a thermal treatment serving to remove the core material. This enables lighter supporting structures to be obtained for nickel hydroxide electrodes. However, the manufacturing methods proposed for such electrodes entail high cost and much time, whereby these drawbacks constitute an important obstacle to manufacture on a large scale and hence extensive application of such supporting structures to nickel hydroxide electrodes.

The present invention is designed to largely obviate the mentioned drawbacks and limitations so as to allow the abovementioned advantages of utilizing nickel hydroxide as a positive active mass to be more fully exploited in order to achieve a high specific capacity while ensuring satisfactory performance at high current densities in alkaline accumulators.

An object of the invention is thus to provide improved nickel hydroxide electrodes while largely obviating the said drawbacks and providing a simplified method of manufacturing such electrodes.

The invention relates to a method of manufacturing a positive nickel hydroxide electrode for galvanic cells. This method comprises the steps of: applying a powder substantially consisting of nickel or a nickel compound onto a highly porous core structure of organic material with a fibrous or reticular texture having a large surface so that said surface is coated with a substantially uniform layer of said powder; subjecting the resulting coated structure to a thermal treatment in such a manner as to provide sintering of the powder particles of said coating and removal of the organic core material and as to thereby produce a strongly consolidated highly porous support structure consisting substantially of nickel and having a texture and porosity corresponding substantially to the initial core structure; and depositing nickel hydroxide in the pores of the resulting support structure to provide the active electrode mass therein.

This method allows the manufacture, in a very simple manner, of an electrically highly conductive, mechanically stable, porous nickel support structure having a large internal surface, high porosity with optimum pore-size distribution and structure, and low specific weight per unit volume.

Any appropriate commercially available material may be selected for the core structure, e.g. a felt or non-woven material consisting of natural or synthetic fibers, or a reticular plastics foam, in order to ensure an optimum pore distribution in the resulting support structure.

It may thus be noted that a broad variety of porous organic core structures may be utilized when carrying out the method according to the invention. The said felt or non-woven materials may consist of cellulose fibers for example, or of various plastics fibers, e.g. of polyacrylonitrile, polyester, polyamide, or polypropylene. One may moreover use various organic foams having an open-cell structure, e.g. synthetic foams based on polyester, polyether or polyurethane, for the core structure.

To manufacture highly porous nickel structures, the organic core structure may also be coated with powders of compounds containing nickel such as nickel oxide or nickel salts, or with powder mixtures of compounds containing nickel and nickel powder. During the thermal treatment in a reducing atmosphere, reduction of the nickel-bearing compounds to metallic nickel occurs with simultaneous sintering.

As further appears from the explanations given hereinafter, application of the powder layer may be achieved in a single, particularly simple operation and very simple, conventional technical means (e.g. a powder bed, spray piston or filter device) can be used for this purpose. The same advantages apply to the subsequent thermal treatment which, as well as application of the powder layer, can be very simply and precisely controlled, whereby high reproducibility may be readily ensured in the manufacture of the support structure.

In order to provide for a desired electrode thickness as well as plane surfaces on either side thereof, the metal coated core structure may be arranged during the thermal treatment between two plates provided with corresponding spacers (e.g. of ceramic material). During this treatment, the core structure is then pressed together under the weight of the upper plate to a desired thickness which is predetermined by the height of the spacers. This further enables control of the pore size as well as the pore structure.

The technical requirements may thus be readily fulfilled with regard to mechanical strength as well as electrical conductivity of the electrode support obtained in this manner. At the same time, an electrode support with a fibrous or reticular metallic structure can be readily obtained which has a particularly large inner surface and can have a porosity of about 95% or even more. Such a support structure moreover facilitates quite considerably the subsequent introduction of the nickel hydroxide into the pores thereof.

It may thus be noted that the special advantages of the support structure provided for in accordance with the invention and in particular its high porosity, favourable pore distribution and pore structure, provide a considerably enhanced accessibility to the entire inner surface of the structure and hence facilitate quite substantially the incorporation of the active mass within the electrode support structure. Fibrous structures present various advantages especially with regard to satisfactory coating and introduction of the active mass, as well as to enabling the finished electrode to provide discharge at high current densities.

The important advantages mentioned above moreover apply with various modes of introducing or forming the nickel hydroxide in the pores of the support structure. Thus, for example, it is possible to achieve satisfactory impregnation of the structure with nickel hydroxide with quite simple mechanical means. To this end, freshly precipitated nickel hydroxide in the form of a suspension may be brought into contact with the support structure which is used as a filter element in a suitable arrangement. The pores may thus be filled substantially with nickel hydroxide by simple mechanical means which may include vibrators, ultrasound generators or means for applying reduced pressure to one side of the support structure or high pressure to the impregnating liquid. It has been found that, after effecting mechanical deposition of the active mass, electrical contact between the support structure and the active mass may be enhanced by further carrying out a chemical impregnation of the structure with a melt of nickel nitrate or with concentrated solutions of other nickel salts such as nickel sulphate or nickel chloride and then converting the nickel salt into nickelhydroxide by immersing the impregnated structure in an alkali hydroxide.

The active mass may also be introduced into the support by electrophoresis, e.g. by subjecting a suspension of nickel hydroxide in nitromethane to electrophoresis at a potential difference of 300 V and by further applying ultrasound to provide better penetration of the active mass into the pores of the support structure.

Also in that case it is advantageous to further effect an additional chemical impregnation in order to improve the contact between the active mass and the support and to thereby ensure improved utilization of the active mass.

Due to the above-mentioned advantages of the electrode support, it is possible to readily and reproducibly incorporate a maximum amount of active mass in the electrode obtained in accordance with the invention while at the same time ensuring intimate contact over a large surface between the active mass and the electrode support. Whichever impregnating process may be used, it is in all cases advantageous to add lithium salts or lithium hydroxide to the impregnating mass in order to enhance the electronic conductivity of the active mass. The amount of lithium thus added should preferably be about 0.5–1% by weight of the active mass.

The present invention now allows a considerable reduction of the manufacturing and material costs and hence of the electrode price to be achieved, while readily ensuring a high proportion of the active mass and good utilization thereof in the electrode.

The following examples serve to further explain the method according to the present invention.

EXAMPLE 1.

A highly porous nickel support structure with a reticular texture is first manufactured. For this purpose, a core structure is used in the form of a polyether foam plate with an open-cell structure having a large surface, a thickness of 6 mm, a specific weight of 0.05 g/cm$^3$ and a porosity greater than 95%.

The foam plate is first dipped in a loose powder bed of nickel Mond powder with a mean grain size between 4 and 7 $\mu$, whereby the nickel powder adheres to the reticular texture of the foam and, after knocking off the excess powder, forms a thin powder layer which covers the texture in a substantially uniform manner.

The foam thus coated with nickel powder is then laid on a first ceramic plate, covered with a second, freely supported ceramic plate and heated to 980°C during 10 minutes in a protective gas atmosphere (mixture of 7% hydrogen and 93% argon, saturated at 25°C with water vapour). This atmosphere is so selected that it permits oxidation of the core structure material for removal thereof while acting as a protective gas which prevents oxidation of the nickel.

During this thermal treatment the volume of the coated core structure shrinks in such manner that the structure is reduced to about 70–90% of its initial surface and its thickness to 1 mm, the latter being predetermined by providing spacers between the plates. The extent of this shrinkage may be influenced by the amount of nickel powder applied per unit volume of the support. A consequence of this process is that the pore dimensions are reduced so as to enhance the utilization of the nickel hydroxide mass, without undesirably affecting the open pore structure.

This thermal treatment results in removal of the polyether foam as well as sintering together the nickel powder particles of the layer, so that a highly consolidated nickel structure is obtained which substantially corresponds to a metallic copy of the organic core structure and has a similar reticular texture with a large surface, a very high porosity of about 90% and a specific weight of only about 0.5 g/cm$^3$ (about 12 g/dm$^2$).

The resulting nickel structure is then used as a support structure for receiving the active mass. To this end, the support structure is polarized cathodically in an electrolysis bath consisting of an aqueous solution of 200 g of nickel nitrate with an addition of 20 g of nickel hydroxide per liter of water. Due to this addition, the electrolysis bath is kept at pH 5–7. The electrolysis is effected at a current density of about 0.05 A/cm$^2$ during 1 to 2 hours and leads to cathodic deposition of nickel hydroxide within the pores of the structure until they are filled to a large extent with the active mass.

The finished nickel hydroxide electrode thus obtained is particularly well suited for use as a positive electrode to high current loads in alkaline accumulators.

Cycling tests with this electrode with discharge in 5 hours in 6N KOH, in a half-cell with a Hg/HgO reference electrode, provided a high specific capacity of about 140 Ah per kg of the electrode weight.

As a variant of the described cathodic deposition, the active mass was also formed in the pores of the support structure by a known chemical impregnation process which however entails a greater time expenditure. To this end, the structure is first immersed during 30 seconds at 90°C in a melt of Ni(NO$_3$)$_2$.6H$_2$O, than dried at 90°C in air, next immersed during 10 minutes at 90°C in a 6N KOH solution to convert the nickel nitrate to nickel hydroxide, and the electrode is finally rinsed with water to remove the remaining alkali and nitrate. This cycle is repeated several times until the pores of the support structure are filled to a large extent with nickel hydroxide.

Similar cycling tests as described above provided for the thus impregnated electrode a high specific capacity of about 160 Ah per kg of the electrode weight.

EXAMPLE 2

A highly porous nickel support structure having a fibrous texture with a large surface is first made by using as a model a core structure in the form of a band of non-woven cellulose fibers which has a thickness of 1.4 mm and a porosity of about 95%, the fiber thickness being about 10 $\mu$.

This non-woven cellulose fiber band is provided with a nickel coating by first passing it between two spray pistols from which Mond nickel powder with a means grain size between 4 $\mu$ and 7 $\mu$ in an air stream onto both sides of the band whereby the nickel powder adheres to the cellulose fibers. One thus obtains a layer of nickel particles which uniformly covers the fibers of the band.

The band of non-woven cellulose fibers thus coated with nickel powder is now subjected to a thermal treatment wherein it is first heated during 10 minutes to 700°C in a stream of air and then heated during 60 minutes to 1050°C in a hydrogen atmosphere.

This thermal treatment provides pyrolysis and combustion of the cellulose with removal of the resulting combustion products by the gas stream, as well as reduction and sintering of the powder particles so that a support structure is obtained in the form of a highly consolidated band which corresponds to a nickel copy of the cellulose core structure and has a thickness of about 1 mm, a fibrous texture with a porosity of about 90 to 95% and a specific weight of about 0.7 g/cm$^3$ (i.e. 7 g/dm$^2$).

The resulting support structure is finally provided with the active mass by cathodic deposition of nickel hydroxide, as described in Example 1. One thus obtains the finished nickel hydroxide electrode which is likewise particularly suitable for use as a positive electrode for providing high current loads in alkaline accumulators.

Cycling tests in a half-cell, as described in Example 1, provided a specific capacity of about 145 Ah per kg of the electrode weight.

As a variant of the cathodic deposition, the chemical impregnation process described in Example 1 was also used to form the active mass in the pores of the support structure.

Similar cycling tests also provided a very high specific capacity of about 170 Ah per kg of the chemically impregnated electrode.

EXAMPLE 3

To improve the adherence of the Ni powder applied as in Example 2, the cellulose fibers of the core structure are provided with a layer of binder before applying the powder.

This may be achieved, for example, by impregnating the cellulose with a solution of trichlorethylene with 1% by volume of light oil and next drying at 100°C. After drying, a thin film of oil remains on the fibers and increases the adhesiveness of the nickel powder. The core structure coated with nickel powder in this manner is further used to manufacture the electrode as described in Example 2.

Example 4

A fibrous nickel support structure is produced as in Example 2, and then placed on a porous glass plate having the bottom side thereof in communication with a container kept under a vacuum of 2 mm Hg. A suspension of nickel hydroxide in alkali hydroxide solution is then prepared by providing an aqueous solution of nickel sulphate with an excess of caustic soda. The resulting suspension is poured onto the support structure to form thereon a layer with a height of about 3 cm, whereby the support structure acts as a filter plate. A vibrator electrode is then arranged in the suspension layer, parallel to the support structure and connected to an ultra-sound generator having a power of 100 W and a frequency of 18,000 Hz. By applying the vacuum and simultaneously operating this generator, the nickel hydroxide suspension is rapidly brought into the pores of the fibrous nickel support structure, so that the electrode support is filled in a few minutes with a large amount of mass, namely 70% by weight of the electrode. The excess hydroxide is then removed from the surface and the electrode is further immersed in a melt of nickel nitrate as described in Example 1 and, after drying, treated in 6N caustic potash. After watering and drying the electrode is ready for use in an alkaline accumulator. Electrochemical cycling of the electrode in a half-cell provides a capacity of 150 Ah/kg.

The nickel powder can also be applied in a different manner than described in the above examples. Instead of a fixed loose nickel powder bed (Example 1), introduction of the core structure, for example, into a fluidized bed of nickel powder, provides contact and adherence of the powder particles on the texture of the core structure, whereby the latter is uniformly coated with nickel powder. It is further possible to apply the nickel powder by spraying onto the core structure, instead of in air, in a liquid, e.g. in water or any other liquid binder. The nickel powder can also be applied by means of a gaseous or liquid carrier medium (e.g. air or water).

The grain size of the powder used should preferably be less than 50 $\mu$, with a mean grain size less than 10 $\mu$.

The said thermal heating treatment should preferably include heating to a temperature between 800° and 1200°C, which can be carried out in a protective atmosphere as described to allow oxidation of the organic core structure, while preventing oxidation of the nickel. It may also include a first heating step, at a temperature of at least 700°C in a oxygen-bearing atmosphere, followed by said heating at a temperature between 800°–1200°C, in a reducing atmosphere.

What we claim is:

1. A method of manufacturing a positive storage battery electrode having an active mass of nickel hydroxide incorporated in a consolidated, porous, nickel electrode support, comprising the steps of:
    a. intimately contacting a highly porous, fibrous or open-pore reticular, organic core structure, having a large internal surface, with a mass of dry powder particles consisting essentially of nickel and having a mean grain size less than 10 microns, so that said particles are brought into contact with said internal surface and adhere thereon to form a substantially uniform powder coating covering the organic core structure;
    b. subjecting the resulting powder-coated organic core structure to a thermal treatment such as to cause sintering of the particles of said powder coating, with removal of the underlying organic core structure, so as to thereby produce a strongly consolidated nickel electrode support structure having substantially the same structure and porosity as the said organic core structure; and
    c. incorporating the active electrode mass in the resulting nickel support structure by depositing nickel hydroxide in the pores thereof.

2. The method according to claim 1, wherein the core structure is provided with a tacky binding agent to enhance adhesion of the applied powder particles.

3. The method according to claim 1, wherein the said powder is applied by contact of the core structure with a nickel powder bed.

4. The method according to claim 3, wherein the said powder is applied by contact of the core structure with a fluidized bed of said powder.

5. The method according to claim 1, wherein said powder is applied by spraying it onto the core structure in a jet of a fluid medium.

6. The method according to claim 1, wherein said thermal treatment includes heating of the coated core structure to a temperature of 800°–1200°C in a protective atmosphere including oxygen in an amount which is so selected as to allow oxidation of the core structure material without oxidation of the applied nickel powder, whereby to allow sintering of the nickel powder particles of said coating and pyrolysis of the core structure material.

7. The method according to claim 1, wherein said thermal treatment includes heating the coated core structure in an atmosphere including oxygen to a temperature of at least 700°C to allow pyrolysis and combustion of the core structure material, as well as heating to a temperature of 800°–1200°C in a reducing atmosphere so as to provide reduction and sintering of the powder particles, whereby to provide said consolidated support structure consisting of metallic nickel.

8. The method according to claim 1, wherein the coated core structure is arranged during said thermal treatment between two plates spaced apart at a predetermined distance.

9. The method according to claim 1, wherein nickel hydroxide is introduced into the pores of the support structure by electrophoresis.

10. The method according to claim 1, wherein lithium is added to the active mass.

11. The method according to claim 10, wherein lithium hydroxide or a lithium salt is added to the active mass.

* * * * *